April 14, 1959  L. O. UPTON ET AL  2,881,563
APPARATUS FOR FORMING FUSED GLASS ARTICLES
Filed Dec. 27, 1957  5 Sheets-Sheet 1
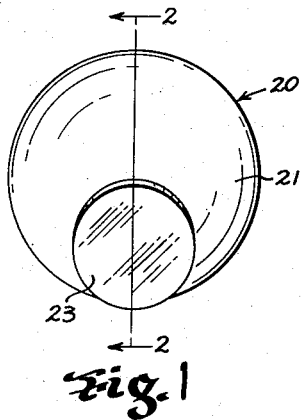
Fig. 1
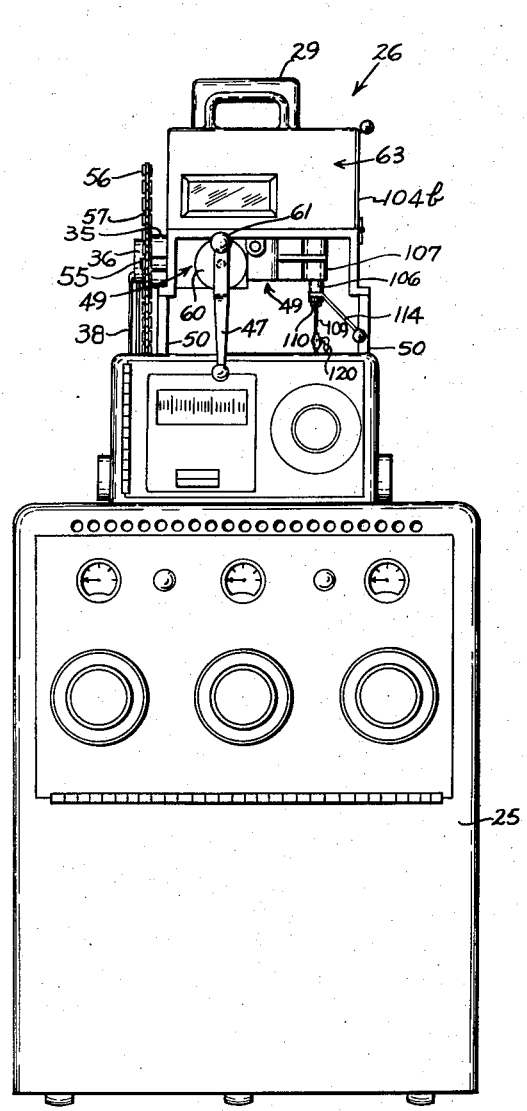
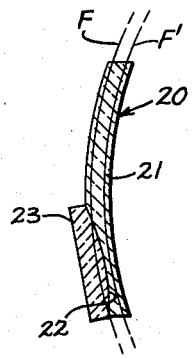
Fig. 2
Fig. 3
INVENTORS
LEE O. UPTON
ERNEST T. DALTON
BY
*Louis L. Gagnon*
ATTORNEY April 14, 1959 L. O. UPTON ET AL 2,881,563
APPARATUS FOR FORMING FUSED GLASS ARTICLES
Filed Dec. 27, 1957 5 Sheets-Sheet 2

INVENTORS
LEE O. UPTON
ERNEST T. DALTON
BY
*Louis L. Gagnon*
ATTORNEY

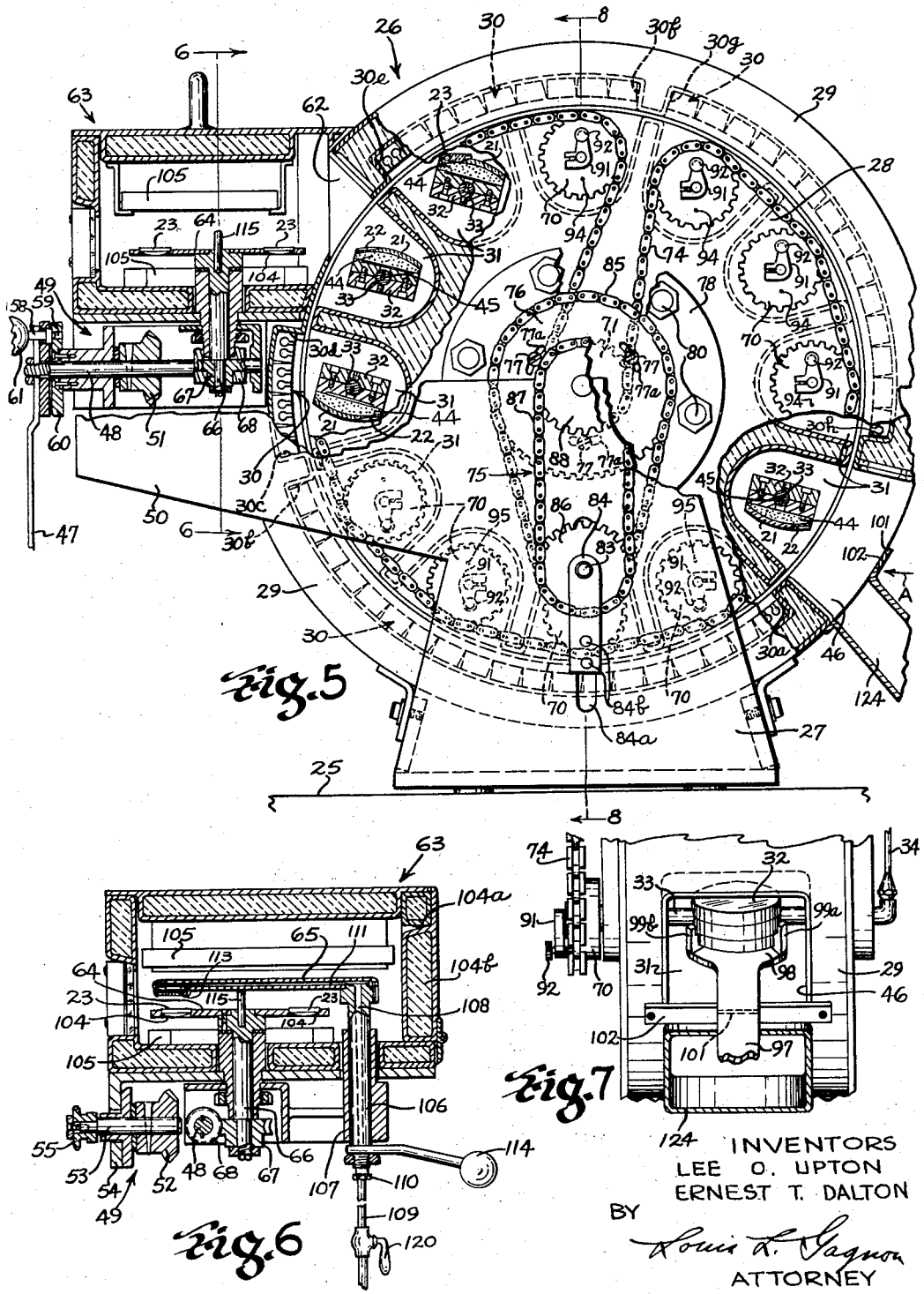

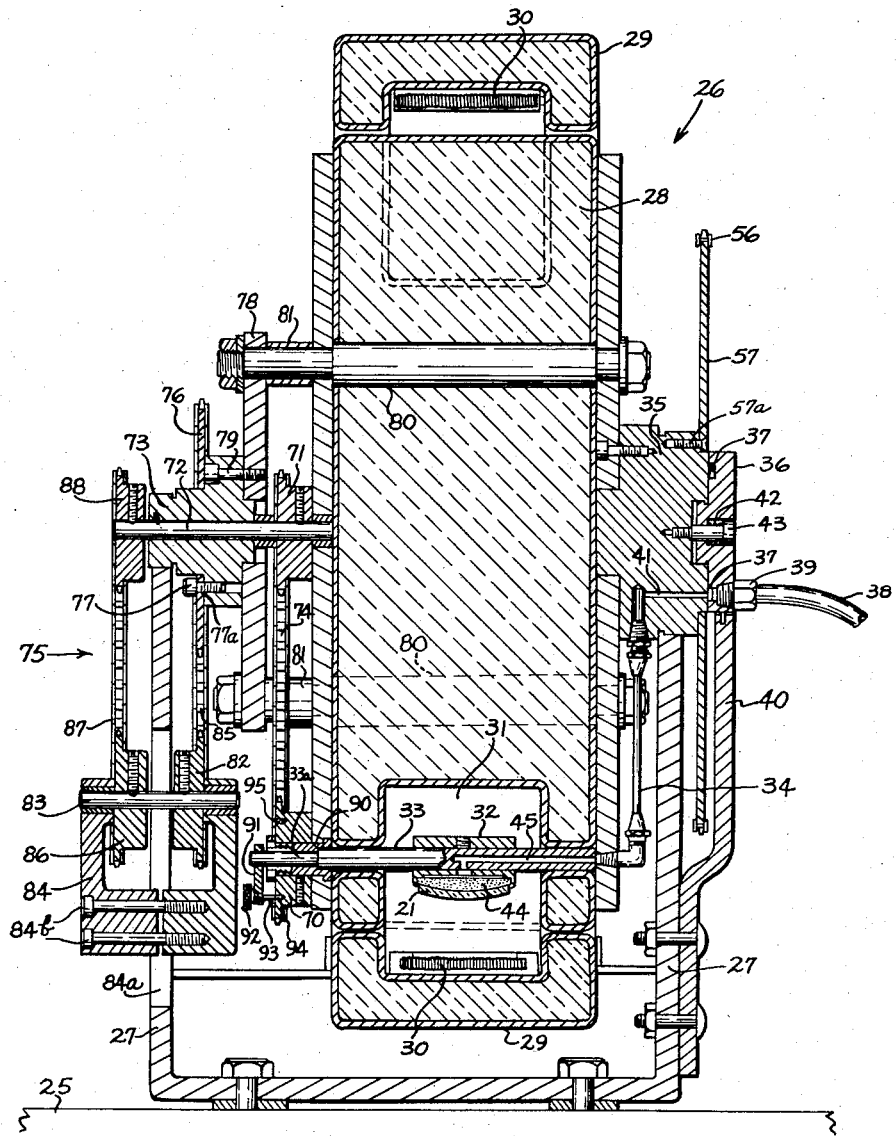

April 14, 1959 L. O. UPTON ET AL 2,881,563
APPARATUS FOR FORMING FUSED GLASS ARTICLES
Filed Dec. 27, 1957 5 Sheets-Sheet 5

INVENTORS
LEE O. UPTON
ERNEST T. DALTON
BY
Louis L. Gagnon
ATTORNEY

_United States Patent Office_

2,881,563
Patented Apr. 14, 1959

2,881,563

APPARATUS FOR FORMING FUSED GLASS ARTICLES

Lee O. Upton and Ernest T. Dalton, Sturbridge, Mass., assignors to American Optical Company, Southbridge, Mass., a voluntary association of Massachusetts Application December 27, 1957, Serial No. 705,539

10 Claims. (Cl. 49—1)

This invention relates to fused glass articles and has particular reference to improvements in apparatus for heat treating and heat-joining the surfaces of such articles.

In the art of fusing glass surfaces with each other, particularly in forming fused blanks for multifocal lenses wherein the interfacial characteristics of the joined surfaces of the respective parts thereof must be of a high degree of optical perfection, there has been the serious problem of avoiding the occurrence of interfacial defects while at the same time providing efficient and economical means for expediently producing fused lens blanks which are suitable for optical use.

In a copending application Serial No. 658,179, filed May 9, 1957, and entitled "Improvements in Fused Glass Articles and Means and Method of Making Same," there has been disclosed in detail a solution to the problem of overcoming the occurrence of interfacial defects in fused lens blanks. While novel means for making superior fused lens blanks has been shown and described in said copending application principally for the purpose of illustrating the features of the invention, there is an urgent need for a more expedient, efficient and economical means for mass producing lens blanks in accordance with the fusing techniques of the copending case.

The present case is therefore primarily concerned with improvements in glass fusing apparatus and it is a principal object of the invention to provide, more particularly in the art of fusing glass articles such as multifocal lens blanks or the like, improved means for semi-automatically heat treating, assembling and heat-joining the parts of glass articles to be fused while avoiding the occurrence of interfacial defects at the heat-joined surfaces of such glass articles.

Another object is to provide novel means for continuously and successively heat treating, assembling and heat-joining the individual parts of a plurality of glass articles such as lens blanks or the like whereby said glass articles may be efficiently and economically mass produced.

Another object is to provide apparatus of the character described which is adapted to perform the steps of dehydrating and oxidizing the surfaces of pieces of glass to be fused to prevent the formation of interfacial bubbles during fusing, temperature-conditioning each of said pieces prior to their assembly to prevent thermal shock or an undesirable glass wetting of one of said pieces by another thereof at the time of their initial contact with each other, maintaining the surfaces of said pieces to be joined substantially free of foreign matter during said dehydration and temperature-conditioning, assembling said pieces in accurate register with each other, causing said pieces to fuse together and thereafter annealing the fused article.

A further object is to provide an apparatus for automatically performing all of the above mentioned functions which is compact, simple to operate, highly efficient in use and which offers a means for producing superior multifocal lens blanks of the fused type on a continuous basis.

Other objects and advantages of the invention will become apparent from the following description when taken in conjunction with the accompanying drawings in which:

Fig. 1 is a plan view of a fused lens blank formed with the apparatus of the invention;

Fig. 2 is a cross-sectional view taken substantially on line 2—2 of Fig. 1, looking in the direction of the arrows;

Fig. 3 is a front elevational view of the device embodying the invention;

Fig. 5 is an enlarged fragmentary side view of a portion of the device of the invention with parts thereof broken away;

Fig. 6 is a vertical cross-sectional view taken substantially on line 6—6 of Fig. 5 and looking in the direction of the arrows;

Fig. 7 is a fragmentary end view of the mechanism shown in Fig. 5 looking in the direction indicated by arrow A;

Fig. 8 is a vertical cross-sectional view taken substantially on line 8—8 of Fig. 5;

Fig. 11 is a fragmentary cross-sectional view taken on line 11—11 of Fig. 9;

Figure 4:
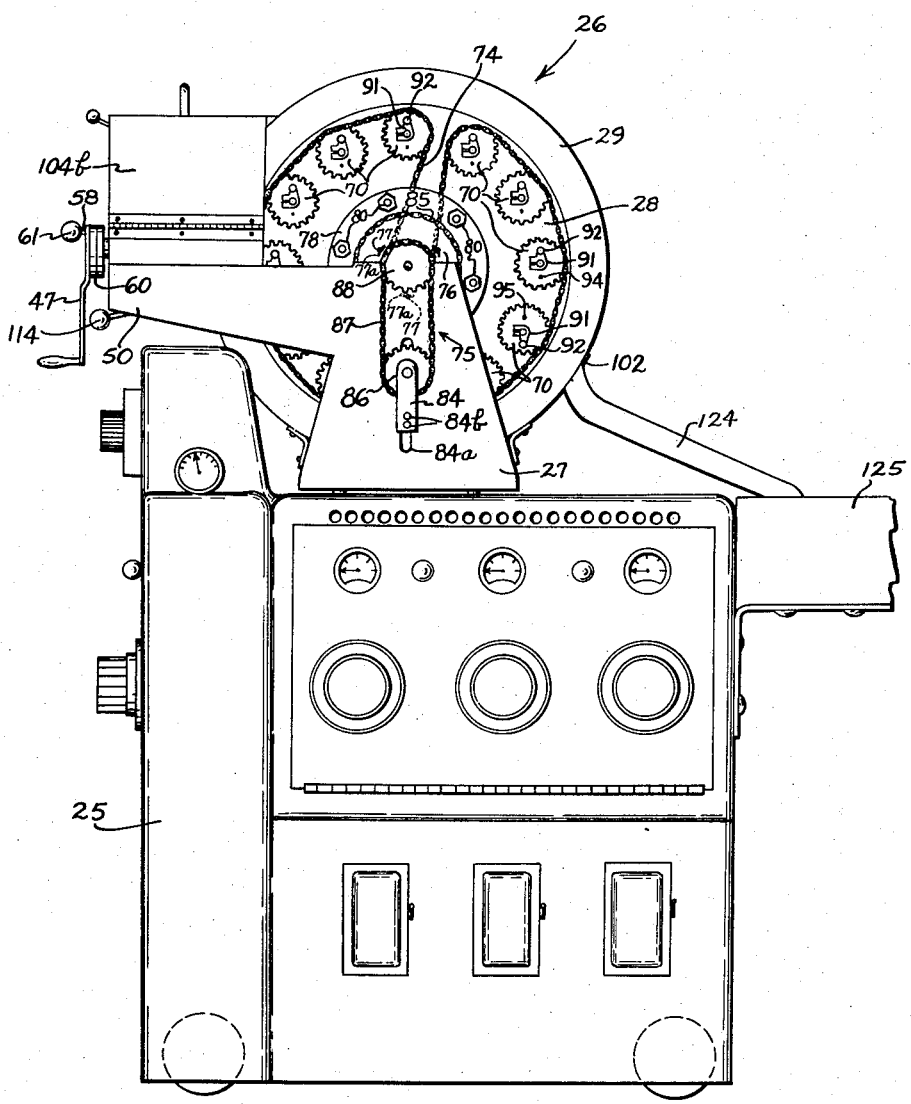
Fig. 4 is an elevational view of one side of the device of the invention.

Referring more particularly to the drawings wherein like characters of reference designate like parts throughout the various views thereof, there is shown in Figs. 1 and 2, a fused multifocal lens blank 20 of a type which is formed with the apparatus of the invention. Lens blank 20 comprises a major part 21 preferably formed of optical crown glass, or the like, having a ground and polished countersink 22 of controlled curvature to which a segment part or disc 23 of flint, barium or other suitable high index optical glass is fused so as to form the minor or segment part of the lens blank 20. The glass composition of disc 23 is selected in accordance with the optical characteristics desired of the segment or reading portion of the resultant lens to be formed from lens blank 20 and the curvature of the countersink 22 is controlled in accordance with the index of refraction of the disc 23 to produce the desired add in power to the reading or segment portion of the finished lens.

The finishing of the lens blank 20 is accomplished by providing predetermined finished surface curvatures F and F', Fig. 2, upon the opposed sides of the lens blank 20 in the conventional manner.

In Figs. 3–13 there is shown the device of the invention which is designed to successively receive, heat treat, assemble, fuse, and anneal the major and minor parts of a plurality of lens blanks of the character described above.

The device of the invention has been designed to semi-automatically carry out the various steps of the lens blank fusing procedure set forth in copending application Ser. No. 658,179 so as to provide more expedient, efficient and economical means for mass producing fused lens blanks of the general character illustrated in Figs. 1 and 2.

To this end, the device of the invention comprises a base 25 upon which is mounted a rotary lens blank fusing furnace generally indicated by numeral 26.

The furnace 26 is mounted on a U-shaped bracket 27 which is bolted or otherwise secured to the base 25 and embodies a drum or cylinder 28 rotatably mounted on the bracket 27, see Fig. 8. A stationary ring-like heating member 29 having heating elements 30 therein is positioned in close encircling relation with the cylinder 28 so as to cause the outer periphery of cylinder 28 to be exposed to the heating elements 30 which are in the heating member 29.

Figure 9:
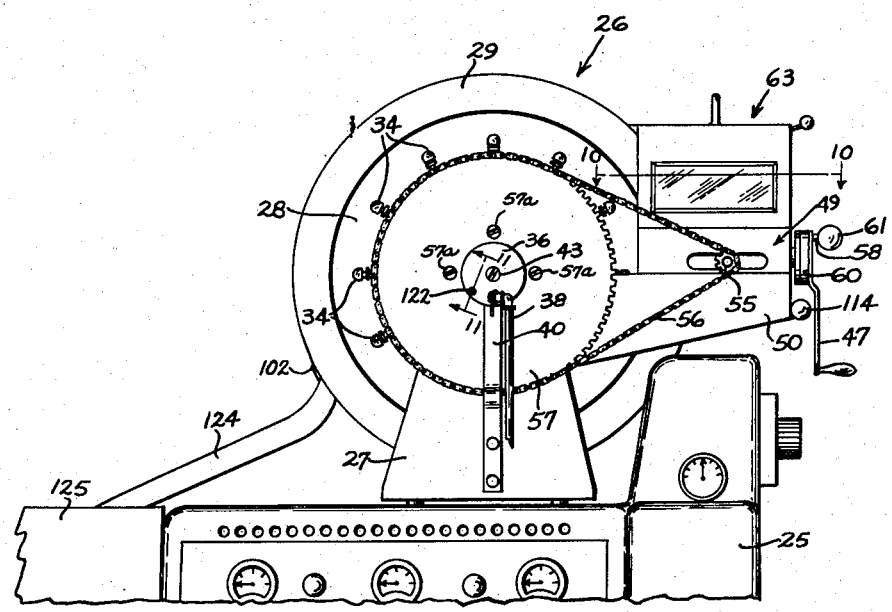
Fig. 9 is a fragmentary side elevational view showing the side of the device of the invention opposite that illustrated by Fig. 4.

The cylinder 28 is provided with a plurality of radially disposed chambers 31 about its outer periphery, each of which opens outwardly so as to expose the interior of the chambers to the heating elements 30 while the cylinder 28 is rotated on bracket 27. In each of the chambers 31 there is provided an invertable lens blank holding block 32 which is supported by a shaft 33 extending transversely through each of the chamber 31. Each of the blocks 32 is adapted to receive and support a major part 21 of a lens blank 20 during the assembling and fusing operations to follow and to accomplish this, one end of each of the shafts 33 is connected to a vacuum line 34 which leads to a hub part 35 of the cylinder 28. The hub 35 is rigidly secured to the cylinder 28 and is provided with an outer cap 36 snugly fitted thereon and having an annular channel 37 on its side engaging the hub 35. The annular channel 37 of cap 36 is connected to a vacuum supply line 38 by means of a connector 39 and the cap 36 is held stationary during rotation of the hub 35 and cylinder 28 by means of a holding bracket 40 which is bolted or otherwise secured to the bracket 27 with its upper end pinned or otherwise directly connected to the cap 36 as illustrated in Figs. 8 and 9. Between each of the vacuum lines 34 and channel 37 there is provided a communication through the hub 35 in the form of a right angled bore 41 so as to cause a vacuum, when produced in supply line 38 by any conventional vacuum creating means, to evacuate the air from lines 34 through their respective bores 41 in hub 35 and the annular channel 37 in cap 36. In order to prevent a venting of the vacuum system from taking place between the engaging surfaces of hub 35 and cap 36, the cap 36 is held in yieldingly, but firm-fitting relation with the hub 35 of cylinder 28 by means of a compression spring 42 which is held under compression beneath the head of a cap screw 43. Screw 43 extends centrally through cap 36 and is threaded into hub 35.

One side of each of the lens blank holding blocks is provided with a permeable lens mounting facing 44 formed of a suitable heat resisting ceramic material, or the like, which has its outer surface shaped substantially to the concave curvature of the major part 21 of the lens blanks 20. A communication in the form of an internal bore 45 is provided through each of the shafts 33 between the vacuum lines 34 and the permeable facing 44 of the block 32. When a major part 21 of a lens blank is placed over the facing 44 with its concave surface in fitting relation with the permeable facing 44 as shown in Figs. 5, 7, 8 and 10, the major part 21 of the lens blank 20, being controlled to be of substantially the same outer contour shape and size as the facing 44, functions to seal the outer surface of the facing 44 whereby the vacuum created in the vacuum system will hold the part 21 of the lens blank firmly against the facing 44.

The major parts 21 of the lens blanks are applied to each of the respective lens-holding blocks 32 by passing the same through an access opening 46, Figs. 5 and 7, in the heating member 29. Opening 46 is of a size and shape substantially equal to the size and shape of the open end of any one of the chambers 31 in the cylinder 28 so that each of the chambers 31 may be successively registered with opening 46 to receive or discharge a major part 21 when the cylinder 28 is rotated predetermined amounts at predetermined intervals in a manner to be discussed in greater detail hereinafter.

The cylinder 28 is rotated by means of a hand crank 47 connected to one end of a shaft 48 which is journaled in a gear box generally indicated by numeral 49 and the gear box 49 is formed integrally with the extensions 50 of the supporting bracket 27. A bevel gear 51, which is pinned or otherwise secured so as to rotate with the shaft 48, is meshed with a mating bevel gear 52 which, in turn, is fixed to one end of a stub shaft 53 journaled in a side wall 54 of the gear box 49. The stub shaft 53 protrudes outwardly of the gear box 49 and is provided with a sprocket 55 at its outermost end, which sprocket is connected with a drive chain 56 to a second but larger sprocket 57 on the rotatable cylinder 28 (see Figs. 6, 8, 9, and 10). The sprocket 57 is attached to the hub 35 of cylinder 28 by screws or the like 57a and it can be seen that rotation of handle 47 will cause sprocket 55 to drive sprocket 57 and thus rotate cylinder 28. The relative sizes of sprockets 55 and 57 are controlled in accordance with the number of chambers 31 in the cylinder 28 so as to cause one 360° rotation of handle 47 to rotate cylinder 28 an amount sufficient to cause one of said chambers 31, when registered with the opening 46 in the heating member, to be replaced by its next adjacent chamber. That is, in the apparatus illustrated in the drawings, there are 12 chambers about the periphery of cylinder 28 and it is evident that for each 360° revolution of sprocket 55, the sprocket 57 must only rotate 1/12 of a revolution or through an arc of 30°. Thus, sprocket 57 is 12 times greater in diameter than sprocket 55.

In order to insure a perfect successive registry of each of the chambers 31 with the opening 46 at each 360° rotation of handle 47, there is provided on the handle 47 a spring detent 58 which is adapted to snap into a mating recess or opening 59 in a stationary plate 60 which is fixed to the gear box 49, see Figs. 3, 4, 5, 9 and 10.

Thus, with the detent fitted in the opening 59, an operator needs only to lift the same out of opening 59 by the use of a handle or the like 61 and rotate handle 47 360° until the detent again drops into opening 59. This insures a precise 360° rotation of handle 47 and sprocket 55, which sprocket 55 and chain 56 causes sprocket 57 and cylinder 28 to rotate 1/12 of a revolution or through an arc of 30° due to the above-mentioned ratio of size of the sprockets 55 and 57.

It will become apparent as the description progresses that in the subsequent assembling of the parts of the lens blanks 20, such a positive means for producing a precise registry of a particular chamber 31 in cylinder 28 with respect to a predetermined location on the heating member 29 (such as opening 46) will also provide means for assisting in accurately locating a disc part 23 on each of the respective major parts 21 of the lens blanks 20.

The disc parts 23 of the lens blanks 20 are applied to the major parts 21 thereof through a second opening 62 (Fig. 5) which extends through the heating member 21 at a location substantially diametrically opposed to opening 46 therein. A heating chamber 63 is mounted on the gear box 49 with one of its ends in communicating relation with the opening 62. In the heating chamber 63, there is provided a turntable 64 adapted to carry a plurality of discs 23 which are to be temperature-conditioned within the heating chamber 63 and subsequently transferred, one at a time, onto a respective major part 21 of a lens blank 20. A delivery arm 65 is also provided in the heating chamber 63 for transferring the discs 23 from the turntable 64 to the major pieces 21 of the lens blanks, see Figs. 6 and 10.

The turntable 64 is fastened to the upper end of a supporting shaft 66 which extends downwardly through the heating chamber 63 and into the gear box 49. A worm follower gear 67 is secured to the lower end of shaft 66 and is in mesh with a worm gear 68 which is driven by shaft 48 so that rotation of shaft 48 by operation of handle 47 will cause the turntable 64 to rotate. The gear ratio between the worm gear 68 and the worm follower 67 is controlled to rotate the turntable 64 an amount sufficient to cause one disc 23, when positioned at a selected unloading location, to be replaced at said location by the next adjacent disc with each 360° rotation of handle 47. That is, the turntable of the device illustrated is adapted to carry ten discs (Figs. 5, 6 and 10), so that with each complete 360° revolution of handle 47, which, as said above, causes cylinder 29 to revolve 1/12 of a revolution, the turntable 64 will simultaneously revolve 1/10 of a 360° revolution.

Following each rotation of handle 47, one of the disc parts 23 is transferred from the turntable 64 to a respective major part 21 of the lens blanks 20 which is on one of the blocks 32 in a particular chamber 31 of the cylinder 28 which chamber 31 is in precise registry with the opening 62. The transfer of the discs 23 is accomplished by means of the delivery arm 65.

Attention is directed to the fact that at the time a major part 21 of a lens blank 20 is applied to a particular one of the holding blocks 32 through the opening 46, the block 32 is in an inverted position to cause the general plane of the countersink 22 therein to face downwardly and during its course of travel in a clockwise direction as viewed in Fig. 5 between opening 46 and opening 62 in the heating member 29, the lens block carrying said major part 21 is maintained in this downwardly facing condition by means of a leveling arrangement illustrated more particularly in Figs. 4, 5 and 8.

The leveling arrangement consists of a chain-driven mechanism which functions cooperatively with each of the block supporting shafts 33 to cause said blocks to be held in their initial downwardly facing direction while they are being carried in a circular path about the axis of rotation of the cylinder 28 during its rotation. An analogy to the operation of the leveling arrangement would be that of the chairs of a Ferris wheel wherein the chairs remain level during their travel about the axis of rotation of the Ferris wheel.

The chain-driven mechanism comprises a sprocket 70 attached to the outer end 33a of each of the block supporting shafts 33 in cylinder 28 and a drive sprocket 71 mounted on a spindle 72 which extends centrally through a hub 73 of the cylinder 28. The spindle 72 is disposed with its longitudinal axis in coincident relation with the axis of rotation of the cylinder 28 and is free to rotate within the hub 73 independently of the rotation of the cylinder 28. An endless drive chain 74 connecting the drive spindle with each of the sprockets 70 is passed over the sprockets 70 so as to mesh with each one thereof while circumferentially encircling the entire group of sprockets 70 (see Figs. 4, 5 and 8). In order to simultaneously drive all of the sprockets 70 by means of the drive sprocket 71, the chain 74 is passed between two adjacent sprockets 70 and around the drive sprocket 71 in the manner illustrated more particularly in Figs. 4 and 5 of the drawings.

During rotation of the cylinder 28, the drive sprocket 71 is driven indirectly through a chain and sprocket train generally indicated by reference numeral 75. The train 75 comprises a sprocket 76 which is adjustably connected to the hub 73 of the cylinder 28 by studs or the like 77 extending through slotted openings 77a in the sprocket 77. In order to provide a spacing between the hub 73 and the adjacent side wall of the cylinder 28, in which the drive sprocket 71 is mounted, the hub 73 is attached to a spacer plate 78 by studs or the like 79 and the spacer plate 78 is, in turn, fixed to the cylinder 28 by means of a plurality of rods 80 which extend through the cylinder 28. Bushings 81 are provided on the outer ends of each of the rods 80 between the spacer plate 78 and the adjacent side wall of the cylinder 28 to retain the spacer plate 78 in a desired spaced relation with cylinder 28.

It can be seen that rotation of cylinder 28 will cause the spacer plate 78, hub 73 and sprocket 76 to rotate as a unit. A second sprocket 82, of a smaller size than sprocket 76, is secured to a spindle 83 which is journaled in an adjustable supporting member 84 rigidly connected to the stationary supporting bracket 27 of the furnace 26. The sprockets 76 and 82 are interconnected by an endless chain 85 which is meshed therewith and the spindle 83 is further provided with an attached second sprocket 86 which is of the same size as sprocket 82. Sprockets 82 and 86 are adapted to be rotated in unison due to their connected relation with spindle 83 and an endless drive chain 87 connects sprocket 86 with an additional sprocket 88 which is fixed to the spindle 72. Sprockets 88 and 71, both being attached to the same spindle 72 will then rotate in unison when driven.

The supporting member 84 is adjustably mounted in a vertical slotted opening 84a in the bracket 27 of the furnace 26 so as to provide means for applying a desired tension on the chains 85 and 87. With the chains 85 and 87 properly positioned on their respective sprockets, the member 84 is moved downwardly in opening 84a until a desired tension is applied to the chains 85 and 87 whereupon the member 84 is securely clamped to the bracket 27 by means of screws 84b.

The operation of the train 75 is as follows:

Rotation of the cylinder 28 in a clockwise direction, as viewed in Fig. 5, will cause sprocket 76, being fixed thereto, to rotate in the same direction. The sprocket 76 and chain 85 will drive sprockets 82 and 86 also in a clockwise direction and sprockets 88 and 71 will be driven clockwise by chain 87. Clockwise rotation of sprocket 71 will then cause each of the sprockets 70 to be rotated counterclockwise by the endless chain 74 to cause each of the shafts 33 in the cylinder 28 to retain their respective lens blocks 32 in a desired level position during rotation of the cylinder 28.

In order to initially set the lens blocks in a desired level position so as to cause the major pieces 21 to ultimately be positioned with their countersink 23 in a downwardly facing condition, the screws 77 are loosened and the sprocket 76 is manually rotated within the limits of the slotted openings 77a so as to drive the shafts 33 through the train 75 independently of the drive means connecting the cylinder 28 with handle 47. The above adjustment normally requires only a slight rotation of sprocket 76 relative to the hub 73 following which the screws 77 are tightened to cause the sprocket 76 to rotate directly with the hub 73.

It is pointed out that the comparative number of teeth on each of the sprockets 70, 71, 76, 82, 86 and 88 are controlled to produce the desired drive ratio necessary to effect the retaining of the above-mentioned level position of the lens blocks 32. For example, with the teeth of all of the above sprockets being of the same pitch, sprockets 70 and 71 are each provided with 23 teeth, sprockets 88, 86 and 82 have 24 teeth and sprocket 76 has 48 teeth. It is to be understood, however, that any combination of sprocket sizes in the train 75 which would produce the desired retaining of the lens blocks 32 in a level position may be used.

While the lens blocks are mechanically rotated as stated above an arrangement is further provided whereby each of the lens block supporting shafts 33 may be manually rotated in their respective chambers 31 independently of the chain-drive leveling mechanism to permit the blocks 32 thereon to be individually revolved when it is desired to cause the countersink side of the major pieces 21 of the lens blanks 20 to face upwardly in the manner discussed above. In this respect, the outer ends of the shafts 33 are each provided with a bushing 90 to which the sprocket 70 is secured and a relatively short drive arm 91 having a thumb screw 92 threadedly engaged therein is provided on the adjacent ends of each of the shafts 33 (see Fig. 8). The screw 92 is provided with a reduced unthreaded shank part 93 which is engaged in a mating opening 94 in the sprocket 70 when the screw 92 is fully threaded into the arm 91. Another opening 95, similar to opening 94, is provided in the sprocket 70 and opening 95 is in diametrially opposed relation to opening 94. With the shank part 93 in one of the openings 94 or 95, it can be seen that the shaft 33 will be driven by sprocket 70. However, by withdrawing the shank part 93 of screw 92 from one of the openings 94 or 95, the shaft 33 may be freely revolved independently of sprocket 70 by swinging the arm 91. The openings 94 and 95 are so disposed in sprocket 70 as to cause the general plane of the countersink 22 of a part 21 of a lens blank 20, when placed on the block 32, to be in a downwardly facing direction when the shank 93 of screw 92 is positioned in the opening 94 and in an upwardly facing direction (revolved 180°) when the shank of screw 92 is positioned in the opening 95.

Figure 10:
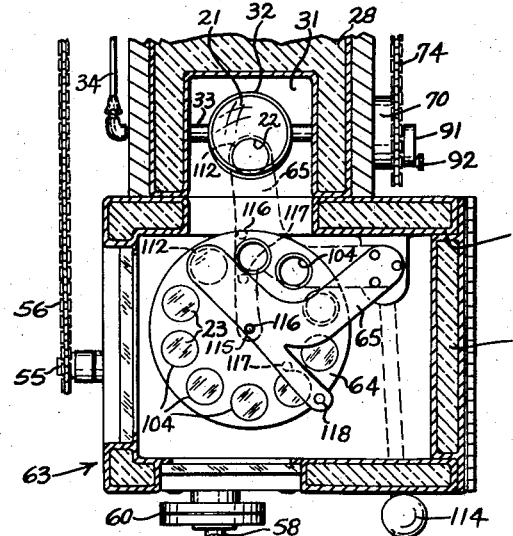
Fig. 10 is a fragmentary sectional view taken substantially on line 10—10 of Fig. 9.
Figures 12, 13:
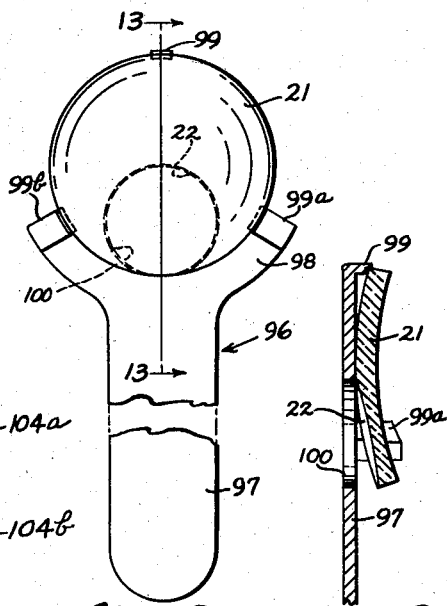
Fig. 12 is a fragmentary plan view of a tool for use with the apparatus of the invention.
Fig. 13 is a fragmentary longitudinal cross-sectional view of the tool taken on line 13—13 of Fig. 12.

The major parts 21 of the lens blanks 20 are successively applied to each of the blocks 32 through the opening 46 in the heating member 21, as discussed above, and in order to cause the countersink portions 22 of each of the major parts 21 to be properly oriented relative to the blocks 32 so as to ultimately be in accurate alignment with a disc part 23 when said disc part is moved into superimposed relation with part 21 by the delivery arm 65, a hand tool or applicator 96, Figs. 10 and 5, is used to align and place the major parts accurately on the blocks 32. The applicator 96 is provided with a handle portion 97 and a lens blank receiving and supporting end 98 having, preferably, three locating and supporting bosses 99, 99a, and 99b, so radially spaced relative to each other as to intimately receive and engage the edges of a major part 21 of a lens blank in the manner illustrated in Figs. 7, 12 and 13. The end 98 of the applicator 96 is further provided with a circular opening 100 of approximately the same diameter as that of the countersinks 22 of the major parts 21. The center of the opening 100 is aligned with the longitudinal axis of the handle 97 so that a major part 21 when fitted between the bosses 99, 99a, and 99b with its concave side facing upwardly may be rotated to align the circumferential outline of its respective countersink with the circumferential outline of the opening 100. This will cause the center of the countersink 22 to lie on the longitudinal axis of the handle part 97 of the applicator.

The major part 21 is then positioned on a block 32, which has been inverted so as to have its supporting facing 44 directed downwardly, by grasping the handle 97 of the applicator 96 and passing the end 98 thereof through opening 46 and into the chamber 31, Figs. 5 and 7. The bosses 99a and 99b of the applicator 96 are elongated to extend above the thickness of the major piece 21 and are placed in engaging relation with the side of the block 32 in the manner illustrated in Fig. 7. This locates the center of the major part 21 substantially coincident with the center of the block 32 and handle 97 of the applicator 96 is simultaneously fitted into a locating notch 101 provided in a guide part 102 which is fastened to the outer casing of the heating member 29. The placing of the handle 97 in the notch 101, which is of substantially the same width as handle 97, causes the countersinks 22 of the major parts 21 of each of the lens blanks so mounted to be properly oriented relative to their respective blocks 32 so as to accurately receive a disc part 23 when the blocks 32 are successively moved into registry with the disc transfer arm 65, mentioned above. The major part 21 is thereafter held on the block 32 by vacuum created by the above described vacuum system.

After having accurately positioned a major part 21 of a lens blank 20 on a lens block 32 in the above manner, the cylinder 28 is rotated clockwise 1/12 of a revolution by operating the handle 47 to move the next adjoining lens block into position for receiving another major part 21. The loading of the major parts 21 is continued by successively repeating the above procedure at predetermined time intervals until the chamber 31 containing the first mounted major part 21 has become registered with the opening 62 into the heating chamber 63.

During their travel from opening 46 to opening 62, each of the countersinks 22 of the major pieces 21 are automatically maintained in a downwardly facing condition by the automatic operation of the above-described leveling arrangement and the said major pieces are simultaneously exposed to heating elements 30 in the heating member 29 to bring about a desired heat treatment. By causing the major pieces 21 to face downwardly during the heat-treating thereof, dust or other particulate matter will not collect on the countersinks 22.

The section of heating elements extending between numerals 30a and 30b is adapted to heat the major pieces passing thereby to a temperature within the range of 1200° F. to 1225° F. so as to oxidize and dehydrate the surfaces thereof. In order to subject the major pieces to the above temperatures for a time period sufficient to bring about an adequate dehydration and oxidation of each of the major parts 21, the cylinder 28 is revolved 1/12 of a revolution in time intervals of approximately 8 minutes in duration. Thus, it can be seen that the major pieces will be exposed to the heating elements 30 between 30a and 30b for a time period of approximately 32 minutes since the span of said heating elements simultaneously covers four of the chambers 31.

The heating elements 30 which span the space between 30c and 30d have controlled characteristics which are such as to reduce the temperature in a chamber 31 which is exposed thereto to approximately 800° F. This reduction in temperature is to prevent thermal shock or an undesirable glass wetting of the pieces of lens blank 20 being assembled at the next adjoining station. It can be seen that the span of the heating elements between 30c and 30d is sufficient to cover the opening of only one chamber 31. Thus, a major piece 21 will be stabilized at the above-mentioned reduced temperature of 800° F. within the 8 minute interval of exposure to said heating elements.

Upon finally reaching a position of registry with the opening 62 into the heating chamber 63, the lens block is rotated 180° by means of the thumb screw 92 and arm 91 discussed above. This causes the countersink 22 to face upwardly in preparation for receiving a disc part 23.

The disc parts 23 are supported on recessed areas 104 which are radially disposed in turntable 64, Figs. 5, 6 and 10, and heating elements 105 are provided within the heating chamber 63 to temperature condition the disc parts 23 prior to their assembly with the major parts 21 of the lens blanks. Since the disc parts 23 are usually formed of an optical flint or barium glass which have lower melting points than crown glass, and have a relatively low concentration of silica, they ordinarily adsorb very little moisture when exposed to normal atmospheric conditions. Consequently, the discs 23 may be dehydrated at lower temperatures than are necessary for the dehydration of the major parts 21 and the heating elements 105 are controlled to maintain a temperature of from 800° to 900° F. in chamber 63, which is adequate to bring about a complete dehydration of the discs 23 when said discs are subjected to such temperatures for a minimum time period of approximately 25 minutes and without distortion of the disc.

With each revolution of the handle 47, the turntable 64, which is adapted to hold 10 discs at a time, revolvses 1/10 of a revolution to successively place the discs 23 in a position to be picked up by the delivery arm 65 and placed on the countersink of a respective major part 21. Thus, by simultaneously indexing the cylinder 28 1/12 of a revolution and the turntable 64 1/10 of a revolution by one complete 360° revolution of the handle 47 every 8 minutes, it can be seen that each disc 23 will be subjected to the temperature of from 800° to 900° F. within the chamber 63 for a period of time of approximately 80 minutes provided 10 discs are maintained on the turntable at all times. Such a period of time is more than adequate to bring about a complete dehydration of the surfaces of the discs. Each time a disc is removed from the turntable 64 by the transfer arm 65, another disc to be heat-treated is positioned on the turntable by passing the same through an opening 104a in the chamber 63. Since the discs 23 only need to be heat-treated in chamber 63 for a minimum time period of approximately 25 minutes, it has been found most convenient to use only 7 of the openings 104 on turntable 64. This causes each disc to be subjected to the heat in chamber 63 for a time period of approximately 56 minutes and allows the discs to be more conveniently loaded onto the turntable since by not using three of the openings 104 the loading position would be substantially in line with the opening 104a in the chamber 63. The opening 104a is provided with a hinged door 104b which is normally maintained closed but is opened at the time the discs 23 are loaded on the turntable 64. Any suitable handling means may be used to pass the discs into the chamber 63 but it has been found preferable to use an elongated tubular vacuum pick-up member such as illustrated in the above-mentioned application Serial No. 658,179.

The assembling of the discs 23 with the major parts 21 is accomplished with the delivery arm 65 which is secured to one end of a rotatable supporting shaft 106. The shaft 106 extends downwardly through the bottom of the chamber 63 and is journaled in a stationary bearing part 107 of the gear box section 49 of the device. In order to provide means for causing the arm 65 to pick up the discs 23, the shaft 106 is provided with a central bore 108 extending therethrough and a vacuum line 109 is connected to its lower end by a coupling 110. An opening 111 is provided through the arm 65 which communicates with the bore 108 in the shaft 106 and leads to the end 112 of the arm 65 which is to pick up the discs 23. The end 112 of arm 65 is provided with a permeable facing 113 on its underside with which the opening 111 communicates. The facing 113 is preferably formed of a heat-resisting ceramic material or the like and functions in a manner similar to the above-mentioned facings 44 on blocks 32. That is, by creating a vacuum in the bore 108 and opening 111 by means of the vacuum line 109. the facing, when placed in contact with a disc 23, will cause the disc 23 to be securely held thereagainst by the vacuum created in the opening 111.

The arm 65 is operated by a handle 114 which is secured to the shaft 106 and a locating and guide pin 115 is provided at the center of the turntable 64 to limit the extent to which the arm 65 is rotated. The underside of the arm 65 is adapted to engage and ride over the upper end of the pin 115 and a plurality of openings 116, 117, and 118, Fig. 10, are provided in the arm 65 to be engaged by the pin 115 when the arm is rotated to certain positions of use by operation of the handle 114. The openings 116 and 118 extend completely through the arm 65 and are used to locate the end 112 of the arm 65 in its positions, one for picking up and the other for placing a disc 23 on a major part 21. In Fig. 10, the arm 65 is illustrated in full lines as being in its position for picking up a disc 23 and is illustrated in dotted lines as being in its position for placing a disc 23 on a major part 21. In the full line position, the pin 115 is engaged in the opening 116 and in the position illustrated by dotted lines, the pin 115 is engaged in opening 118. When not in use, the arm 65 is moved by handle 114 to a neutral position where opening 117 engages the pin 115. The opening 117 extends only slightly into the arm 65 so as to effectively function as a detent to locate the arm in a standby position and to cause it to be held in a lifted-away position from the turntable 64. The openings 116 and 118, however, allow the arm to drop down into contact with a disc 23 or to bring a disc 23 into contact with a major part 21, as the case may be.

The assembling of the parts of each of the lens blanks 29 is accomplished as follows:

Immediately following the combined indexing of the cylinder 28 and turntable 64 which is brought about by rotation of handle 47, as discussed above, the block 32 which carries a major part 21 of a lens blank is rotated 180° to position the side of the blank having the countersink 22 therein in an upright position and the delivery arm 65, which is normally at rest in its neutral position on pin 115, is rotated counterclockwise, as viewed in Fig. 10, by moving handle 114 counterclockwise until the opening 116 is engaged by pin 115. At this point, the arm will, due to its weight, drop down and cause the permeable face 113 thereof to accurately engage a disc 23. With the above-described vacuum system in operation, the engaged disc will become attached to the face 113. The arm 65 is next raised by lifting handle 114 until the pin 115 is clear of the opening 116 following which the arm is rotated clockwise past opening 117 until the opening 118 becomes registered with the pin 115. At this point, the disc will be accurately registered with the countersink 22 and the arm 65 will automatically drop down and cause the disc 23 attached thereto to accurately engage the countersink 22 of the major part 21. The arm 65, however, may be restrained from causing the disc 23 to engage the countersink while it is still attached to the face 113 thereof by permitting the arm to drop only to a point when the disc is slightly above the countersink 22 and thereafter releasing the disc from arm 65, whereupon the disc will fall the remaining distance onto the countersink. The disc 23 is released from the arm 65 by closing the vacuum line 109 with a valve or the like 120, Fig. 6, and the arm is raised to cause the opening 118 to clear the pin 115 whereupon the arm 65 is moved counterclockwise to its neutral position. The disc which has been removed from the turntable 64 is then replaced by another similar disc and the above procedure is repeated after each indexing of the cylinder 28 and turntable 64.

It is pointed out that the radii of curvature on the sides of the discs 23 which are to ultimately engage the countersinks 22 are controlled to be slightly steeper or shorter than the radii of curvature of the countersinks 22 so that after having been released from the delivery arm 65 during their assembly with the major parts 21, each of the discs 23 by reason of its related curvature with the curvature of the countersink will automatically seek its own center of gravity on the countersinks 22, in the manner described in detail in the above-mentioned copending application Serial No. 658,179.

After the assembly of a particular disc 23 with its respective major part 21, each successive indexing of the cylinder 28 will carry the assembled lens blank past other heating elements 30 which extend between points 30e and 30f. The heating elements between points 30e and 30f are controlled to produce a temperature of from 1150° F. to 1200° F. in the chambers 31 passing thereby to cause a fusing of the discs 23 to the major parts 21. With each indexing cycle being of an 8 minute duration, as mentioned above, it can be seen that since the heating elements between 30e and 30f simultaneously extend over the open ends of two chambers 31, the fusing time will be approximately 16 minutes which is adequate to provide a substantially perfect distortionless interfacial fusion between the parts of the lens blanks 20.

Following the fusing of the lens blanks, they are passed by a final set of heating elements 30 which extend between points 30g and 30h. The heating elements between points 30g and 30h are controlled by any conventional means to produce a partial annealing of the fused lens blanks by providing a gradual reduction in temperature in each of the chambers 31 passing thereby. In this respect, the heating elements between the points 30g and 30h are adapted to gradually reduce the temperatures in the chambers 31 from the above-mentioned fusing temperatures down to a temperature approximately within the range of 800° to 900° F. during the time cycle of approximately 24 minutes which is required for each chamber 31 to travel from point 30g to point 30h.

Upon reaching a position of registry with the opening 42, the vacuum to the particular lens block 32 so disposed, is shut off by depressing the button 122, Figs. 11 and 9, which is located in the stationary cap 36 of the hub part 35 of the cylinder 28. The button causes the plunger 123 to close the communication between the channel 37 and only the vacuum line 34 which leads to the lens block 32 which is aligned with the above-mentioned opening 46 in the heating member 29.

While maintaining the button 122 depressed, the lens block 32 is inverted by operating its respective thumb screw 92 and arm 91, as described above. This causes the fused lens blank 20 to fall from the block since the vacuum to the facing 44 of block 32 is shut off. The lens blank is then directed by a chute or the like 124 to be further and finally annealed by any conventional slow cooling furnace or annealing means 125 (Figs. 4 and 9).

After the fused lens blank is removed from its respective block 32 the block is locked in its inverted position by thumb screw 92 and another major part 20 to be processed is applied thereto.

It is particularly pointed out that the above-described apparatus is specifically designed to semi-automatically carry out the lens fusing procedures which are set forth in detail in the copending application Serial No. 658,179. However, the apparatus described above may be modified in accordance with the size, shape and types of glass used to form other fused type lens blanks without departing from the spirit of the invention as expressed in the accompanying claims.

It is to be understood that all matter shown and described herein is to be interpreted as illustrative and not in a limiting sense.

The invention claimed is:

1. Apparatus of the character described for fusing glass articles comprising a main support, a cylinder rotatably mounted on said support, means for rotating said cylinder, stationary temperature conditioning means in adjacent peripherally surrounding relation with said cylinder and having heating means therein exposed to said cylinder, first and second openings through said temperature conditioning means peripherally spaced from each other and providing access to said cylinder, a plurality of radially disposed substantially equally peripherally spaced chambers in said cylinder opening outwardly toward said stationary temperature conditioning means, invertible holding means in each of said chambers each for holding a first part of an article to be fused with a second part thereof, means functioning in cooperation with said means for rotating said cylinder for simultaneously maintaining each of said holding means and a respective first part of an article to be fused when attached thereto in an inverted position during a predetermined part of each revolution of said cylinder which takes place between said first and second openings in said temperature conditioning means and for reverting and maintaining each of said holding means in a substantially upright position during the remaining part of each revolution of said cylinder, a heating chamber in communication with said second opening through said temperature conditioning means for supporting and heating a plurality of said second parts of said articles to be fused, transfer means in said heating chamber adapted to extend through said second opening in said temperature conditioning means for individually transferring said second parts of said article each onto a respective first part thereof when said first part is located on one of said holding means which is disposed substantially upright and at a predetermined aligned position relative to said second opening through said temperature conditioning means, said heating means in said temperature conditioning means being adapted to cause said parts of said article, when assembled, to be fused while passing thereby during rotation of said cylinder, means for causing said holding means to be reinverted upon reaching a predetermined aligned relation with said first opening through said temperature conditioning means and means for releasing said fused article to cause same to pass through said first opening and outwardly of said furnace.

2. A furnace for fusing multifocal lens blanks comprising a main support, a chambered cylinder rotatably mounted on said support, means for rotating said cylinder, stationary temperature conditioning means in surrounding adjacent relation with said cylinder, said stationary temperature conditioning means having first and second substantially diametrically opposed openings therethrough, a plurality of substantially equally peripherally spaced chambers in said cylinder opening outwardly toward said stationary temperature conditioning means, invertible holding means in each of said chambers each for holding a major part of a lens blank to be fused with a segment part thereof, said first opening in said temperature conditioning means being located to provide access to each of said chambers in said carrier when they are rotated into communicating relation therewith whereby said major pieces may be applied to said holding means through said first opening, means functioning in cooperation with said means for rotating said carrier for simultaneously maintaining each of said holding means and said major parts of said lens blanks when applied to said holding means in an inverted downwardly directed position during one half of each revolution of said cylinder between said first and second openings and for reverting and maintaining each of said holding means in a substantially upright position during the remaining half of each revolution of said cylinder, a heating chamber in communication with said second opening through said temperature conditioning means for supporting and heating said segment parts of said lens blanks to be fused, transfer means in said heating chamber adapted to extend through said second opening in said temperature conditioning means for individually transferring each of said segment parts of said lens blanks onto a respective major part thereof when said major part is located on one of said holding means which is disposed substantially upright and at a predetermined aligned position relative to said second opening through said temperature conditioning means, heating means in said temperature conditioning means exposed to said carrier between said first and second openings therein for temperature conditioning said major pieces during their travel between said first and second openings when said cylinder is rotated, other heating means in said temperature conditioning means exposed to said cylinder for causing a fusion of said parts of said lens blanks during their return travel from said second opening to said first opening, means for causing each of said holding means to be inverted upon reaching a predetermined aligned relation with said first opening and means for releasing said fused articles from said holding means to cause same to pass through said second opening and outwardly of said furnace.

3. A furnace for fusing multifocal lens blanks comprising a main support, a cylindrical chamber rotatably mounted on said support, means for rotating said cylinder, stationary temperature conditioning means in adjacent peripherally surrounding relation with said cylinder and having heating means therein exposed to said cylinder, said temperature conditioning means having a pair of openings therein giving access to said cylinder, a plurality of open-ended radially disposed substantially equally peripherally spaced chambers in said cylinder opening outwardly toward said stationary temperature conditioning means, invertable holding means in each of said chambers each for holding a major part of a lens blank to be fused to a segment part thereof, a first one of said openings through said temperature conditioning means providing access to each of said chambers in said carrier when a respective one of said chambers is rotatably positioned in alignment with said opening whereby major parts of lens blanks may be removed from and applied to said holding means, inverting means functioning in cooperation with said means for rotating said cylinder for inverting and simultaneously maintaining each of said holding means and a respective major part of an article to be fused, when attached thereto, in an upside down position during a predetermined part of each revolution of said carrier beginning from said first opening in said temperature conditioning means, a second of said openings in said temperature conditioning means being disposed so as to communicate with said chambers in said cylinder at a circumferential distance in one direction from said first opening substantially equal to the circumferential distance traveled by said cylinder during said predetermined part of a revolution thereof, said inverting means being adapted to reinvert each of said holding means upon reaching a predetermined aligned relation with said second opening and to maintain each of said holding means in a substantially upright position during the remaining part of each revolution of said cylinder which takes place from said second opening back to said first opening, a first heating means in said temperature conditioning means exposed to the chambers in said cylinder, said first heating means being adapted to dehydrate and oxidize the surfaces of said major pieces of the lens blanks while said major pieces are being passed over said first heating means during the rotation of said cylinder through said predetermined part of each revolution, a heating chamber in communication with said second opening through said temperature conditioning means for supporting and heating said segment parts of said lens blanks to be fused, transfer means in said heating chamber adapted to selectively extend through said second opening in said temperature conditioning means for transferring the segment parts of said lens blanks from said heating chamber into engaging aligned relation with their respective major parts when each of said major parts, located on a respective holding means, is disposed substantially upright and at a predetermined aligned position relative to said second opening through said temperature conditioning means, second heating means in said temperature conditioning means between said second opening therein and said first opening along the path of travel of said chambers in said cylinder which takes place during said remaining part of each revolution of said cylinder, said second heating means being adapted to cause the parts of each of said lens blanks to be fused while passing thereby, means for causing said holding means to be reinverted to an upside down position upon reaching a predetermined aligend relation with said first opening through said temperature conditioning means and means for releasing said fused lens blanks from said holding means to cause the same to fall through said second opening and outwardly of said furnace.

4. A furnace for fusing multifocal lens blanks comprising a main support, a drum-like chambered cylinder rotatably mounted on said support, means for rotating said cylinder, stationary temperature conditioning means in adjacent peripherally surrounding relation with said cylinder and having heating means therein exposed to said cylinder, a pair of openings through said temperature conditioning means giving access to said cylinder, a plurality of open-ended radially disposed substantially equally peripherally spaced chambers in said cylinder opening outwardly toward said stationary temperature conditioning means, invertable holding means in each of said chambers each for holding a major part of a lens blank to be fused with a segment part thereof, a first one of said openings through said temperature conditioning means providing access to each of said chambers in said cylinder when a respective one of said chambers is rotatably positioned in alignment with said opening whereby major parts of lens blanks may be removed from and applied to said holding means, inverting means functioning in cooperation with said means for rotating said cylinder for simultaneously maintaining each of said holding means and a respective major part of an article to be fused, when attached thereto, in an upside down position during a predetermined part of each revolution of said cylinder, a second of said openings in said temperature conditioning means being disposed so as to communicate with said chambers in said cylinder at a predetermined circumferential distance from said first opening, said inverting means being adapted to revert each of said holding means upon reaching a predetermined aligned relation with said second opening and to maintain each of said holding means in a substantially upright position during the remaining part of each revolution of said cylinder, a heating chamber in communication with said second opening through said temperature conditioning means for supporting and heating said segment parts of said lens blanks to be fused, transfer means in said heating chamber adapted to selectively extend through said second opening in said temperature conditioning means for transferring the segment parts of said lens blanks from said heating chamber into aligned engaging relation with their respective major parts thereof when each of said major parts, located on a respective holding means, is disposed substantially upright and at a predetermined aligned position relative to said second opening through said temperature conditioning means, said heating means in said temperature conditioning means being adapted to dehydrate and oxidize the surfaces of said major pieces of the lens blanks while said lens blanks are traveling through said predetermined part of each revolution of said cylinder and said heating means being further adapted to cause the parts of each of said lens blanks to be fused while traveling through said remaining part of each revolution of said cylinder, means for causing said holding means to again be inverted to an upside down position upon reaching a predetermined aligned relation with said first opening through said temperature conditioning means and means for releasing said fused lens blanks from said holding means to cause the same to fall through said second opening and outwardly of said furnace.

5. A furnace for fusing glass articles comprising a main support, a drum-like chambered cylinder rotatably mounted on said support, stationary heating means in peripherally surrounding adjacent relation with said cylinder, a plurality of substantially equally peripherally spaced chambers in said cylinder opening outwardly thereof and exposed to said heating means, invertable holding means in each of said chambers each for holding a first part of an article to be fused with a second part thereof, means for intermittently rotating said cylinder and simultaneously acting leveling means for maintaining each of said holding means in a predetermined level condition relative to said main support during rotation of said cylinder, a heating chamber on said main support for heating said second parts of said articles to be fused and means in said heating chamber for successively transferring each of said second parts of said articles to be fused onto a respective first part thereof when said first parts are positioned on a respective one of said holding means and successively rotated to a predetermined position relative to said heating chamber for receiving said second parts.

6. A device for fusing glass parts together comprising a rotatable member having means in a peripheral portion thereof for receiving and supporting a first one of the glass parts, a first heating chamber adjacent the periphery of said rotatable member having a passageway communicating with said member at a location considerably spaced from the initial location of said means for receiving and supporting said first glass part and having means therein for supporting a second one of said glass parts, a second heating chamber intermediate the first heating chamber and the initial location of the means for receiving and supporting the first glass part and to which said first glass part is exposed during the rotation of said member, means for rotating said member to move said first glass part past said second heating chamber to a position in alignment with said first heating chamber and means in said first heating chamber for positioning said second glass part in engaging relation with said first glass part.

7. A device for fusing glass parts together comprising a rotatable member having means in a peripheral portion thereof for receiving and supporting a first one of the glass parts, a first heating chamber adjacent the periphery of said rotatable member having a passageway communicating with said member at a location considerably spaced from the initial location of said means for receiving and supporting said first glass part and having means therein for supporting a second one of said glass parts, a second heating chamber intermediate the first heating chamber and the initial location of the means for receiving and supporting the first glass part and to which said first glass part is exposed during the rotation of said member, means for rotating said member to move said first glass part past said second heating chamber and to a position in alignment with said first heating chamber, means in said first heating chamber for positioning said second glass part in engaging relation with said first glass part and a third heating chamber to which said engaged glass parts are exposed by further movement of said rotatable member for causing said glass parts to fuse with each other.

8. A device for fusing glass parts together comprising a rotatable member having means in a peripheral portion thereof for receiving and supporting a first one of the glass parts with the exposed face of said part disposed in a downward direction, a first heating chamber adjacent the periphery of said rotatable member having a passageway communicating with said member at a location considerably spaced from the initial location of said means for receiving and supporting said first glass part and having means therein for supporting a second one of said glass parts, a second heating chamber intermediate the first heating chamber and the initial location of the means for receiving and supporting the first glass part and to which said first glass part is exposed during the rotation of said member, means for rotating said member to move said first glass part past said second heating chamber, while maintaining said exposed face in a downward direction, to a position in alignment with said first heating chamber, means for reversing said first glass part to position its exposed face in an upward direction and means in said first heating chamber for positioning said second glass part in superimposed relation with said first glass part.

9. A device for fusing glass parts together comprising a rotatable member having means in a peripheral portion thereof for receiving and supporting a first one of the glass parts, a first heating chamber adjacent the periphery of said rotatable member having a passageway communicating with said member at a location considerably spaced from the initial location of said means for receiving and supporting said first glass part and having means therein for supporting a second one of said glass parts, means for heating said first glass part as it travels intermediate the first heating chamber and the initial location of the means for receiving and supporting the first glass part, means for rotating said member to move said first glass part from said initial location to a position in alignment with said first heating chamber and means in said first heating chamber for positioning said second glass part in engaging relation with said first glass part at said location.

10. A device for fusing glass parts together comprising a rotatable member having means in a peripheral portion thereof for receiving and supporting a first one of the glass parts, a heating chamber adjacent the periphery of said rotatable member having a passageway communicating with said member at a location considerably spaced from the initial location of said means for receiving and supporting said first glass part and having means therein for supporting a second one of said glass parts, a first heating means intermediate the heating chamber and the initial location of the means for receiving and supporting the first glass part and to which said first glass part is exposed during the rotation of said member to heat said first glass part to a relatively high temperature, a second heating means between said first heating means and said heating chamber for reducing the temperature of said first glass part during rotation of said member and prior to the alignment of said first glass part with said heating chamber, means for rotating said member to move said first glass part past said first and second heating means in that order and to a position in alignment with said heating chamber, means in said heating chamber for positioning said second glass part in engaging relation with said first glass part, a third heating means to which said engaged glass parts are exposed by further movement of said rotatable member beyond said position of alignment with said heating chamber for causing said glass parts to fuse with each other and a fourth heating means between said third heating means and said initial location of said means for receiving and supporting said first glass part for annealing said fused glass parts when passed thereby by further rotation of said member.

References Cited in the file of this patent

UNITED STATES PATENTS

| | | |
|---|---|---|
| 1,638,452 | Panajiotaros et al. | Aug. 9, 1927 |
| 2,026,606 | Bausch | Jan. 7, 1936 |
| 2,433,013 | Ziegler | Dec. 23, 1947 |
| 2,691,246 | Roeber | Oct. 12, 1954 |